(12) United States Patent  
Pollmann-Retsch (10) Patent No.: US 8,552,657 B2
(45) Date of Patent: Oct. 8, 2013

(54) METHOD OF DRIVING A GAS-DISCHARGE LAMP

(75) Inventor: Jens Pollmann-Retsch, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 619 days.

(21) Appl. No.: 12/745,911

(22) PCT Filed: Dec. 1, 2008

(86) PCT No.: PCT/IB2008/055021
§ 371 (c)(1),
(2), (4) Date: Jun. 3, 2010

(87) PCT Pub. No.: WO2009/072051
PCT Pub. Date: Jun. 11, 2009

(65) Prior Publication Data
US 2010/0244744 A1     Sep. 30, 2010

(30) Foreign Application Priority Data

Dec. 3, 2007 (EP) .................................. 07122142

(51) Int. Cl.
*H05B 41/16* (2006.01)
(52) U.S. Cl.
USPC ........ 315/247; 315/224; 315/209 R; 315/291; 315/307

(58) Field of Classification Search
USPC .............. 315/224, 247, 209 R, 291, 297, 307
See application file for complete search history.

(56) References Cited

U.S. PATENT DOCUMENTS

| | | | |
|---|---|---|---|
| 5,485,061 | A | 1/1996 | Ukita et al. |
| 2004/0004447 | A1 | 1/2004 | Trostl et al. |
| 2004/0183472 | A1 | 9/2004 | Kamoi et al. |
| 2005/0151483 | A1 | 7/2005 | Nagai et al. |
| 2006/0273744 | A1 | 12/2006 | Callewaert et al. |
| 2007/0126374 | A1 | 6/2007 | Haruna et al. |

FOREIGN PATENT DOCUMENTS

| | | |
|---|---|---|
| EP | 1727401 A1 | 11/2006 |
| JP | 2003272882 A | 9/2003 |
| WO | 2008017980 A1 | 2/2008 |

*Primary Examiner* — Tuyet Thi Vo (57) ABSTRACT

The invention describes a method of driving a gas-discharge lamp (1) wherein, at any one time, the lamp (1) is driven according to one of a plurality of different driving schemes (DS1, DS2) and the lamp power is controlled according to one of a plurality of different power control strategies (PCS, PCf, and wherein the lamp (1) is driven according to a first driving scheme (DS1) prior to a trigger event (tsw) and, upon occurrence of the trigger event (tsw), a driving scheme switchover is effected so that the lamp (1) is subsequently driven according to a second driving scheme (DS2), and wherein, in temporal dependence on the trigger event (tsw), a power controls strategy switch over is effected from a first power control strategy (PCs) to a second power control strategy (PCf) such that the lamp power is subsequently controlled according to the second power control strategy(PCf) for a time interval (tm, tf).

16 Claims, 7 Drawing Sheets

FIG. 1 state of the art

FIG. 2 state of the art

METHOD OF DRIVING A GAS-DISCHARGE LAMP

FIELD OF THE INVENTION

The invention describes a method of driving a gas-discharge lamp, and a driving unit for driving a gas-discharge lamp.

BACKGROUND OF THE INVENTION

In gas discharge lamps such as HID (High Intensity Discharge) and UHP (Ultra-High Pressure) lamps, a bright light is generated by a discharge arc spanning the gap between two electrodes disposed in the lamp. Advances in lamp manufacture, fill gas composition, and electrode design have led to the development of short-arc and ultra-short-arc discharge lamps, in which the tips of the electrodes are separated in the discharge chamber of the lamp by a very short distance, for example one millimeter or less, and the arc that spans this separation is therefore also short, but of intense brightness. Such lamps are useful for applications requiring a bright, near point source of white light, for example in image projection applications.

However, because of the high temperatures that are reached during operation at high voltages, the electrodes of such a lamp are subject to changes, i.e. an electrode tip may burn back, or 'structures' may grow at one or more locations on the electrode tip at the point where the arc attaches to the tip. Such physical alterations to the electrode can result in fluctuations in the brightness of the arc, since the arc may become longer or shorter, leading to fluctuations in the light output (flux) of the lamp. In an image projection system, such alterations in the light flux may even be noticeable to the user, an effect which is evidently undesirable.

Therefore, a stable arc length is of utmost importance in projection applications. Maintaining the light flux in modern projectors ultimately means maintaining a short arc-length for prolonged times. Therefore, in many cases, dedicated lamp driving schemes are employed in an effort to maintain the arc length. These schemes often include sophisticated combinations of different current waveshapes and operating frequencies, designed so that alterations to the electrode tips are avoided where possible, or that the growing and melting of structures on the electrodes occur in a controlled manner, so that the arc length can be stabilized. Depending on the choice of lamp driving scheme, modifications to the electrode surface can take effect within short to very short timescales.

In any one driving scheme, the lamp is driven with a certain lamp current waveshape at a certain frequency. The current waveshape can include pulses that recur at certain intervals, for instance 'anti-flutter' pulses, and this waveshape is usually not changed for the duration of a driving scheme. A switchover at some point in time between driving schemes occurs when one or more parameters of the lamp driving scheme are altered, for example by changing the current waveshape or operating frequency. For instance, the amplitude or width of a current pulse can be altered, or the operating frequency can be suddenly increased or decreased by a considerable factor. This change may be triggered, for example, by an observed parameter of the lamp such as the lamp voltage approaching a certain threshold, or be initiated after expiration of a pre-defined time interval.

The environment in an operating gas discharge lamp can be regarded as unstable or volatile, largely due to the nature of the lamp filling and the high operating temperatures and voltages. For instance, even during 'steady' operating conditions, the lamp voltage can be subject to brief but extreme fluctuations. For this reason, lamp parameters such as the lamp voltage are generally measured at regular intervals, for example every few milliseconds, and any decision to correct or adjust the lamp driving, e.g. a decision to correct or adjust the driving current, is usually based on a mean or average value of the observed input parameter, for example the lamp voltage, in a closed-cycle power control loop. An example is given by a PID (proportional-integral-derivative) controller, which attempts to maintain the lamp power at a certain target level such as the rated lamp power in response to an alteration in an input variable such as the value of the lamp voltage. Adjustment of the lamp power follows relatively slowly after the sudden change in lamp driving scheme. In this way, for example, glitches or peaks in the lamp voltage do not exert an immediate or direct influence on the lamp power, but are averaged into an overall value.

As mentioned above, advanced driving methods for short-arc lamps of the described types often include sudden changes of some parameter at well-known switching times. However, sudden changes such as an abrupt change of the lamp operation current waveshape or operating frequency resulting in an increase in the lamp voltage may lead to fluctuations in the light output of the lamp. The reason for this is that a closed-cycle power control of the lamp driver, based on a mean or average value of the observed parameter as described above, operates with a delay. As a result, the lamp power can exceed its rated or target value for a period of time, and the power overshoot can be observed as an increase in collected light flux. Changes in the light flux of such a lamp can be visible to a user of the application, and are therefore undesirable.

Therefore, it is an object of the invention to provide an uncomplicated way of stabilizing the light flux of a gas-discharge lamp of the type described above.

SUMMARY OF THE INVENTION

To this end, the present invention describes a method of driving a gas-discharge lamp wherein, at any one time, the lamp is driven according to one of a plurality of different driving schemes and the lamp power is controlled according to one of a plurality of different power control strategies, and wherein the lamp is driven according to a first driving scheme prior to a trigger event and, upon occurrence of the trigger event, a driving scheme switchover is effected so that the lamp is subsequently driven according to a second driving scheme, and wherein, in temporal dependence on the trigger event, a power control strategy switchover is effected from a first power control strategy to a second power control strategy such that the lamp power is subsequently controlled according to the second power control strategy for a time interval.

In applications using a gas-discharge lamp of the type described in the introduction under constant flux requirements, a lamp parameter such as lamp voltage is usually monitored in order to identify a situation in which the lamp voltage approaches a lower or upper threshold, indicating, for example, that the electrodes have burned back. In reaction to such a situation, a change in current waveshape or operating frequency of the driving scheme is initiated to rectify the problem. The instant in time at which this change takes place—the 'trigger event'—can be registered as it occurs. However, since the change is initiated by the lamp driver itself, the instant in time can also be known in advance and can be predicted by the lamp driver. The method according to the invention advantageously makes use of this knowledge to effect the power control strategy switchover for a time interval around the known trigger event, thus synchronizing the power-control strategy to a change in the driving scheme. The power control strategy switchover can occur simultaneously with the trigger event and driving scheme switchover, or can even precede the trigger event and driving scheme switchover.

The advantage of switching over from one power control strategy to another lies in the ability to adjust the lamp power specifically to the conditions that arise as a result of the driving scheme switchover. Instead of applying the same type of power control, for example a closed-loop power control with corresponding delay, the lamp power can be controlled in a manner that specifically takes into account the abrupt changes that can occur at a driving scheme switchover, as will be explained in detail below.

An appropriate driving unit for driving a gas-discharge lamp comprises an event management unit for detecting or anticipating a trigger event and a driving scheme management unit for selecting one of a plurality of different driving schemes, according to which the lamp is to be driven, based on the output of the event management unit. The driving unit according to the invention further comprises a power control strategy management realised to select, in temporal dependence on the trigger event, one of a plurality of different power control strategies according to which the lamp power is to be controlled for a time interval.

The dependent claims and the subsequent description disclose particularly advantageous embodiments and features of the invention.

In power control strategies employed in state of the art lamp drivers for gas discharge lamps, for example in image projection applications, the lamp parameter that is observed by the lamp driver can be determined as a mean value over some time interval and/or by calculating the deviation from a predefined target value. Such calculations require a set or collection of measurement values taken in the past, usually at regular intervals such as every few milliseconds. For example, a mean voltage value may be calculated by obtaining the mean of the momentary voltage value and the previous fifty measured voltage values, or the previous hundred measured voltage values. As already described in the introduction, computing a mean value in this way allows irrelevant stochastic fluctuations in the measured lamp parameter to be averaged or smoothed out. Furthermore, a deviation measure allows for larger correction steps when the deviation of the observed parameter from its target is large. However, in such a state of the art driving method, a sudden change in some driving scheme factor such as a sudden increase in operating frequency or lamp current is not reflected directly by a corresponding change in the mean lamp voltage. Instead, the adjustment of the mean lamp voltage lags behind, so that the lamp power is also not corrected as quickly as would be desired using such a state of the art power control strategy.

Therefore, in a particularly preferred embodiment of the invention, at least one of the power control strategies comprises a direct, or 'fast', power control strategy and the lamp power reacts essentially directly to changes in the momentary lamp voltage while the lamp power is being controlled according to such a direct power control strategy. Furthermore, at least one of the power control strategies is an indirect or slow power control strategy of the type described above, such as PID power control strategy. In such a particularly advantageous embodiment of the invention, the reaction of the lamp power to changes in lamp voltage is faster when the lamp power is being controlled according to a direct power control strategy than when the lamp power is being controlled according to an indirect power control strategy.

In a fast power control strategy, the lamp power reacts essentially directly to a change in, for example, the lamp voltage. Instead of using a mean or average voltage value requiring past-history values, the lamp power can react to the momentary voltage value according to the formula for electrical power, $P=U \cdot I$, where P is power, U is voltage, and I is electrical current. In the method according to the invention, a fast power control strategy can involve simply correcting the lamp current in response to the most recently observed voltage value. In this way, should the lamp voltage suddenly increase as a result of a change in the lamp driving scheme, the lamp current can be adjusted more or less immediately so that the lamp power can be maintained at an essentially constant value. This approach significantly reduces fluctuations in the collected light flux of the lamp.

During 'normal' operation of the lamp using the slower indirect or closed-loop power control strategy, the electrodes of the lamp, as already mentioned, are subject to alterations such as burning back. These alterations can result in a gradual change in the lamp voltage, for example a steady increase in lamp voltage towards an upper threshold. The trigger event or driving scheme switchover occurs when such a threshold is reached, i.e. a point in time at which a correction must be made in order to avoid an undesirable situation. Therefore, in a preferred embodiment of the invention, the power control strategy switchover in temporal dependence on the trigger event preferably comprises a switchover from an indirect power control strategy to a direct power control strategy, so that the lamp power can quickly adjust to any resulting abrupt increase in lamp voltage or current.

A direct power control strategy is based, for example, on a momentary or most recently observed lamp parameter such as lamp voltage, and is therefore unsuitable for use during 'normal' operation of the lamp, during which fluctuations in lamp voltage are best averaged out. Therefore, the direct power control strategy is preferably applied for only a limited time interval, and, after expiration of the time interval, control of the lamp power preferably reverts to an indirect power control strategy.

As already mentioned above, the driving scheme switchover can involve a sudden change in a lamp parameter such as the lamp voltage. Therefore, in a further embodiment of the invention, the power control strategy switchover takes place essentially simultaneously with, or synchronous to, the driving scheme switchover. In other words, the power control strategy switchover takes place in response to the trigger event.

Since the driving scheme switchover is initiated by the lamp driver, the time at which the trigger event occurs can be established in advance. Therefore, in a further preferred embodiment of the invention, the power control strategy switchover can pre-empt or anticipate the trigger event, i.e. the power control strategy switchover can take place before the trigger event, for example preceding the driving scheme switchover by a few milliseconds. This type of power control strategy switchover can precede, for example, a trigger event that arises when a counter of the lamp driver has reached a predefined value, since this type of trigger event can be easily foreseen by the lamp driver. An obvious advantage of timing the power control strategy switchover in this way is that the lamp power can react even faster to any change in parameters associated with the driving scheme switchover.

After effecting a switchover, the lamp could conceivably be driven indefinitely using the 'new' lamp driving scheme and power control strategy. However, it may be expedient, for example, to return to the original driving scheme or power control strategy after an interval of time. To this end, the behaviour of the lamp in reaction to a switchover from an indirect to a direct power control strategy may be monitored or observed in laboratory experiments. For example, it may be established that the lamp voltage stabilises again after a certain time interval following a trigger event and a resultant sudden increase in lamp voltage. This time interval can be noted and used in lamp drivers manufactured for commercial use. Therefore, in a preferred embodiment of the invention, control of the lamp power reverts to the indirect power control strategy after expiration of a predefined duration or time interval. The interval of time can be stored as a value in a memory of the lamp driver, and a suitable counter can count the time elapsed, for example starting at the same time as the trigger event, and indicate that the power control strategy should revert to the indirect strategy when the counter value has reached the predefined value.

Alternatively, it may be expedient to revert power control back to an indirect strategy only when the operation of the lamp has stabilised after a driving scheme switchover. Therefore, in a further preferred embodiment of the invention, one or more lamp parameters such as lamp voltage, lamp current, or one or more counter values are measured or observed, and the time interval endures or lasts until one or more of the observed lamp parameters satisfies a predefined condition. By ensuring that power control only reverts back to the indirect strategy when operation of the lamp has stabilized, a more constant light flux can be obtained.

A driving unit according to the invention can include one or more lamp parameter observation units such as those employed in state of the art driving units for monitoring or observation of lamp values, or for counting predefined time intervals. Units that make decisions based on predicted or measured parameters, such as the event management unit, the driving scheme management unit and the power control strategy management unit, may include hardware components such as processor chips upon which suitable software modules can be run.

The driving unit according to the invention could be implemented in a suitable state of the art projection system comprising a gas-discharge lamp, so that the lamp can be driven using the method according to the invention as described above. Therefore, with relatively little effort, a high-quality projection system can be obtained that provides a light output with essentially constant flux. Evidently, the method and driving unit according to the invention could be applied to any application that makes use of a gas-discharge lamp as described, and that requires a stable arc and constant light flux.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
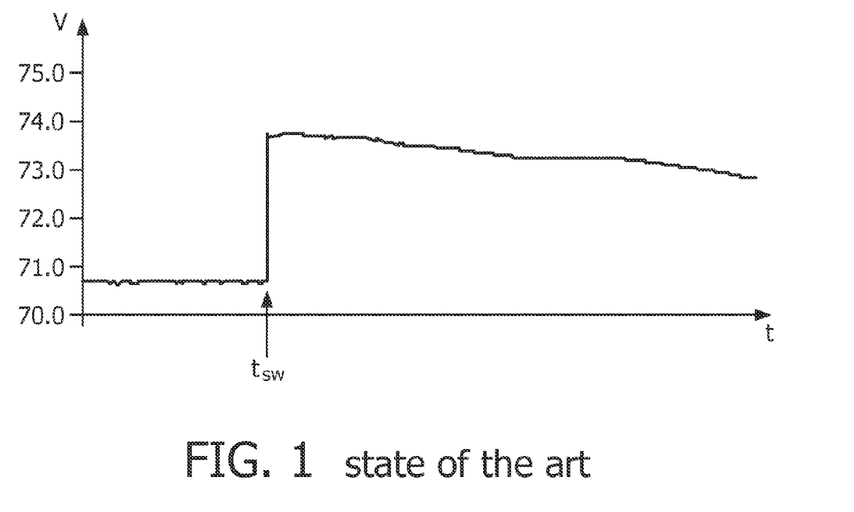
FIG. 1 shows a graph of the lamp voltage before and after a driving scheme switchover as controlled by a state of the art lamp driver.

FIG. 1 shows a graph of the lamp voltage for a gas-discharge lamp after a change of driving scheme typical for state of the art lamp drivers. Such a driving scheme switchover might take place when, for example, measurements or observations indicate that the frequency of the lamp current should be increased to control alterations in shape of the electrode tips. In this example, the driving scheme switchover takes places at time $t_{sw}$ and results in an abrupt increase in lamp voltage. Since the change in lamp voltage is essentially 'triggered' by the switchover, the time $t_{sw}$ is also referred to as the 'trigger event' in the following.

Figure 2:
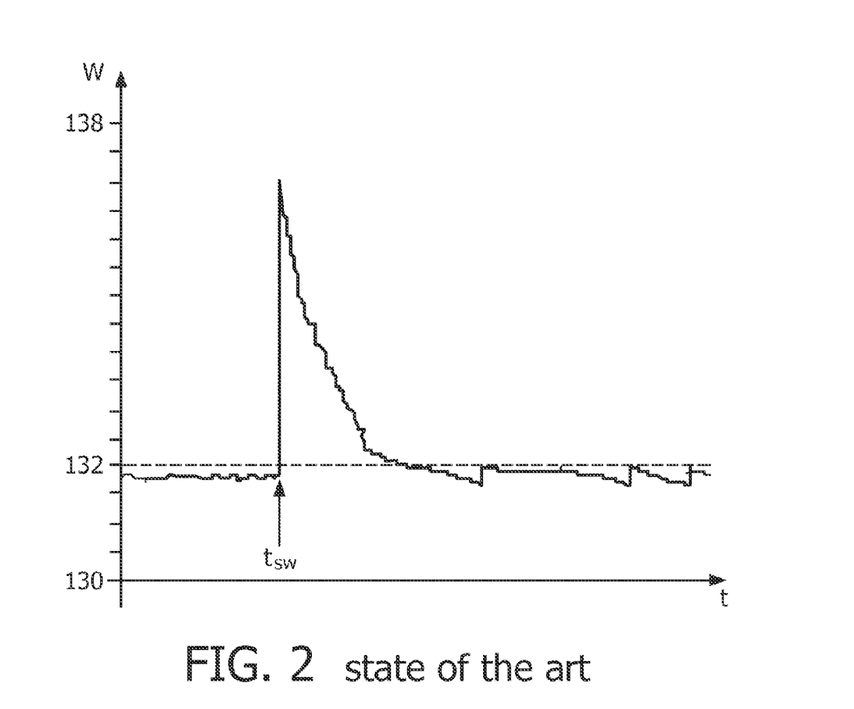
FIG. 2 shows a graph of the lamp power as controlled by a state of the art lamp driver in response to the driving scheme switchover of FIG. 1.

FIG. 2 shows the effect of the driving scheme switchover of FIG. 1 on the lamp power, when a state of the art lamp driver is used. In such a lamp driver, the lamp voltage is averaged out over time to compensate for fluctuations, and this average value is used as an input parameter to a closed-loop method of power control, for example a PID control technique. In such a power control method, the reaction of the lamp power to a change in lamp voltage is delayed. In this diagram, it can clearly be seen that the lamp power increases in response to the trigger event (abrupt increase in lamp voltage). This example shows observed values for a 132 W lamp. Prior to the trigger event, the lamp is operating at approximately the rated power of 132 W. Following the trigger event $t_{sw}$, the lamp power increases steeply, reaching a top value of 138 W and then gradually decreasing again towards the rated power value. The reason for the steep increase, as already explained, is because older, lower values of voltage prior to the trigger event $t_{sw}$ are also used in calculating the present lamp power. As the graph clearly shows, the delayed reaction causes the lamp power to exceed the rated power by several watts for a considerable duration of time. This undesirable increase in lamp power can be observed as an increase in light output of the lamp, i.e. an increase in the collected flux of the lamp, and may be noticeable to the user.

Figure 3A:
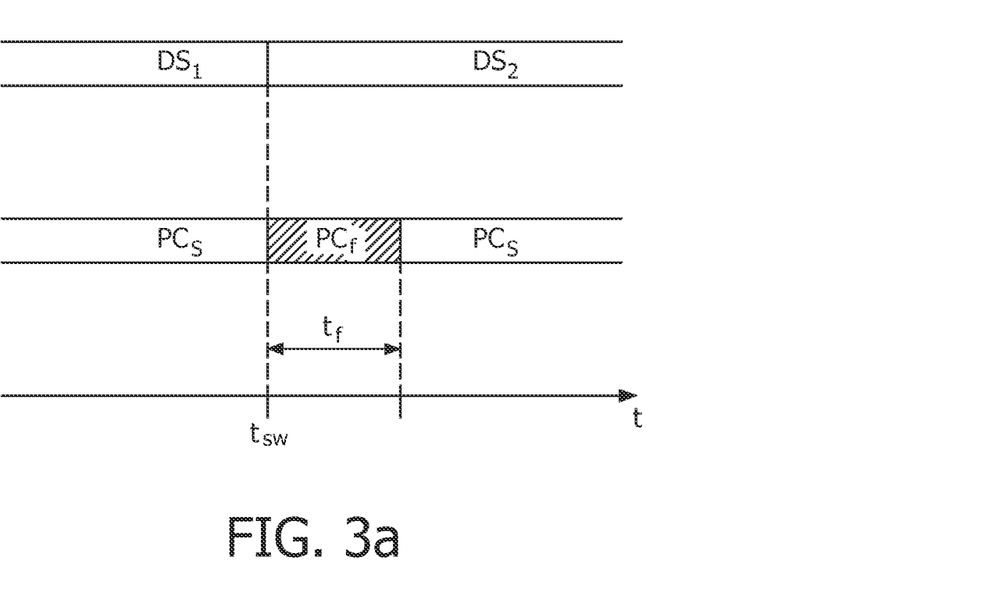
FIG. 3a shows a schematic representation of a first temporal relationship between a trigger event, a driving scheme switchover and a power control strategy switchover according to the invention.

FIG. 3a shows a schematic representation of a first temporal relationship between a trigger event $t_{sw}$, a driving scheme switchover and a power control strategy switchover using the method according to the invention. Here, a driving scheme switchover occurs at time $t_{sw}$ when the lamp driver changes from a first driving scheme $DS_1$ to a second driving scheme $DS_2$. Prior to the trigger event $t_{sw}$, the lamp power was controlled using a first or 'slow' power control strategy $PC_s$, in which, for example, the lamp voltage is averaged over time to even out irrelevant fluctuations, and this average lamp voltage value is used in the power control strategy. According to the invention, the trigger event $t_{sw}$ can either be predicted or observed. In any case, a power control strategy switchover is effected as a result, so that the trigger event $t_{sw}$ leads to a switchover to a second or 'fast' power control strategy $PC_f$, in which the lamp voltage is used essentially directly to regulate the lamp power, instead of an average lamp voltage value. This may also be a closed loop power control strategy, but using, for example, the momentary voltage value as the observed input parameter instead of using an average value, or instead of using a PID control. In this example of a first temporal relationship between the trigger event $t_{sw}$ and the power control strategy switchover, the 'fast' power control strategy $PC_f$ is applied for a fixed length of time $t_f$. This time interval $t_f$ can have been determined in advance, for example in experimental tests for that particular type of lamp.

Figure 3B:
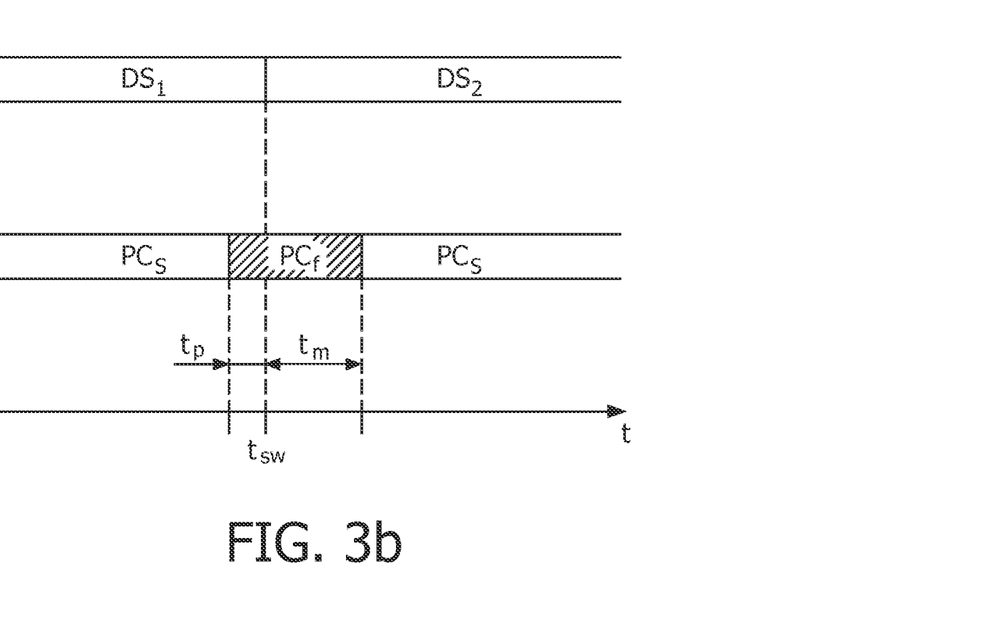
FIG. 3b shows a second temporal relationship between a trigger event, a driving scheme switchover and a power control strategy switchover according to the invention.

In FIG. 3b, a schematic representation of a second temporal relationship between a trigger event $t_{sw}$, a driving scheme switchover and a power control strategy switchover is shown. Again, the driving scheme switchover occurs at time $t_{sw}$ when the lamp driver changes from a first driving scheme $DS_1$ to a second driving scheme $DS_2$. However, this example illustrates the possibilities that are given when the lamp driver or driving unit can look ahead or predict the trigger event $t_{sw}$. As already explained, the driving unit may comprise units or modules that monitor lamp parameters such as lamp voltage, and analyse the behaviour of these parameters. Using the information or data gathered in this way, the lamp driver can plan a driving scheme switchover at a certain time, and can accordingly schedule a power control strategy switchover before the actual trigger event $t_{sw}$. In the example shown in this diagram, the lamp power was controlled using a first or 'slow' power control strategy $PC_s$ up to a time interval $t_p$ preceding the trigger event $t_{sw}$, and a 'fast' power control strategy $PC_f$ is applied thereafter and for an interval of time $t_{sw}$, after the trigger event $t_{sw}$, until a monitored lamp parameter such as lamp voltage has stabilised to a predefined value. Naturally, the 'fast' power control strategy $PC_f$ could be applied for a predefined duration after the trigger event $t_{sw}$, as was illustrated using FIG. 3a above.

Figure 3C:
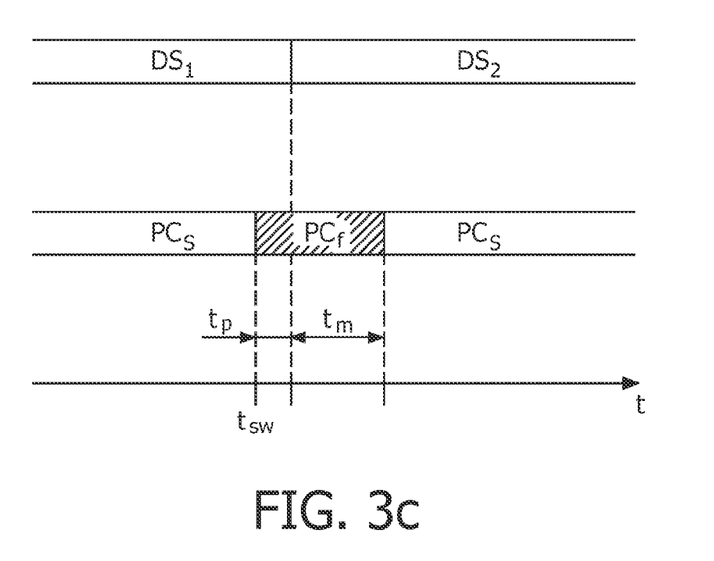
FIG. 3c shows a third temporal relationship between a trigger event, a driving scheme switchover and a power control strategy switchover according to the invention.

Another embodiment of this principle of asynchronous, planned switching is shown in FIG. 3c. Here, at the trigger event $t_{sw}$, the power control strategy is first switched from a slow strategy $PC_s$ to a fast strategy $PC_f$. Then, after a delay $t_p$ or time interval $t_p$, the driving scheme switchover from the first scheme $DS_1$ to the second scheme $DS_2$ is effected. The power control strategy is switched back to the slow strategy $PC_s$ after another time interval $t_f$ or $t_m$. In this case, the actual temporal relationships between the different switching events for driving schemes and power control strategies are comparable to those shown in FIG. 3b.

Although FIGS. 3a, 3b and 3c are limited, for the sake of clarity, to only show two driving schemes and two power control strategies, it will be clear that more than two driving schemes and more than two power control strategies can be implemented using the method according to the invention, and that the invention is not in any way limited to this number.

Figure 4:
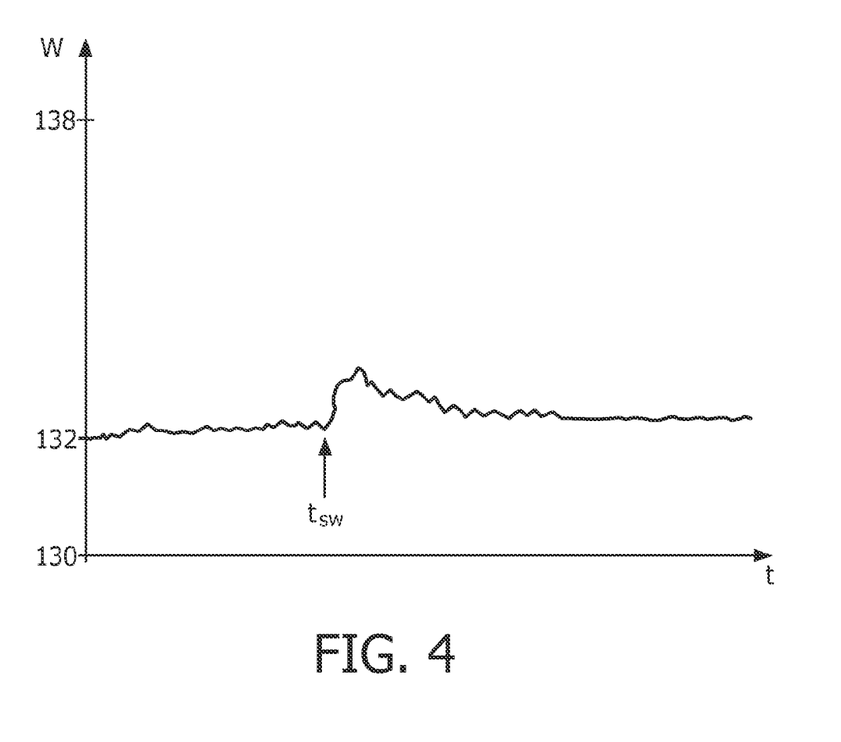
FIG. 4 shows a graph of the lamp power as controlled by the method according to the invention.

The improved reaction of the lamp power to the driving scheme switchover explained in FIG. 3a is shown in FIG. 4.

Following the trigger event, the 'fast' power control strategy allows the lamp power control to more or less immediately react to a change in the lamp current or voltage. The 'fast' power control strategy does not use a collection of past observations to derive a momentary input value of, for example, voltage. Instead, the lamp power can be adjusted immediately using the most recent measured value. In other words, the driving unit can respond with the shortest possible delay to a change in lamp current. This is in contrast with the state of the art response shown in FIG. 2, in which the lamp power increased abruptly to a level well above the rated power level and took a considerable length of time to settle back down to the rated power level.

Figure 5:
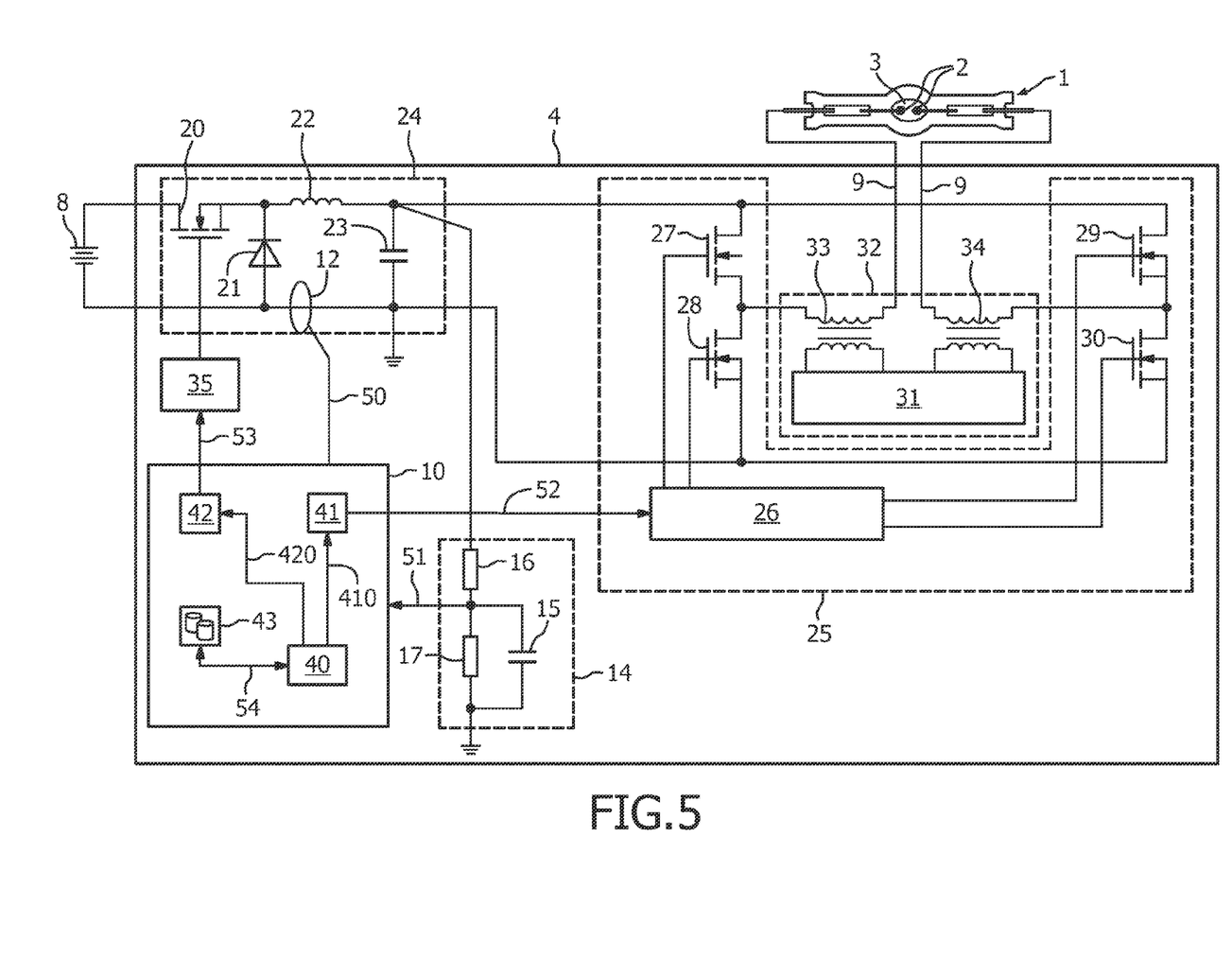
FIG. 5 shows a gas discharge lamp and a driving unit according to one embodiment of the invention.

FIG. 5 shows a gas discharge lamp 1 and a block diagram of one embodiment of a driving unit 4 according to the invention.

The driving unit 4 is connected via connectors 9 with the electrodes 2 inside the arc tube 3 of the gas discharge lamp 1, and receives its power from an external power supply 8 which can deliver a DC voltage. In this exemplary embodiment, the driving unit 4 comprises a buck converter 24, a commutation unit 25, an ignition arrangement 32, a level converter 35, a voltage measuring unit 14, a current measuring unit 12, and a control unit 10. The control unit 10 in this embodiment is shown to incorporate an event management unit 40, a driving scheme management unit 41, and a power control strategy management unit 42.

The function of the control unit 10 is ultimately to control the buck converter 24, the commutation unit 25, and the ignition arrangement 32. Essentially, the control unit 10 dictates the waveshape of the lamp current, as well as controlling the lamp power. To determine the behaviour of the lamp power, the control unit 10 monitors the lamp voltage as measured by the voltage measuring unit 14, in this example a voltage divider 14.

The ignition arrangement 32 comprises an ignition controller 31 (comprising, for example, a capacitor, a resistor and a spark gap) and an ignition transformer which generates a high voltage using two chokes 33, 34 to ignite the gas discharge lamp 1.

The buck converter 24 is fed by the external power supply 8 which can deliver a DC voltage of, for example, 380V. The buck converter 24 comprises a switch 20, a diode 21, an inductance 22 and a capacitor 23. The control unit 10 controls the switch 20 via a level converter 35, and thus also controls the level of the current in the gas discharge lamp 1. By adjusting the level converter 35, the control unit 10 thus regulates the electrical power being provided to the lamp 1.

The commutation unit 25 comprises a switch controller 26 which controls four switches 27, 28, 29, and 30. The waveshape of the lamp current is controlled by an appropriate driver control signal 52 from the control unit 10 to the switch controller 26, dictating the instants at which the lamp current should commutate. In this way, for example, the frequency of the lamp current can be adjusted according to the requirements of the driving scheme being applied.

The voltage measuring unit 14 for measuring the lamp voltage is connected in parallel to the capacitor 23, and is realized in the form of a voltage divider with two resistors 16, 17 that deliver an appropriate signal 51 to the control unit 10. A voltage divider does not deliver the actual lamp voltage value, but instead delivers a reduced value of voltage, which can easily be corrected at a later stage in the control unit 10 to reflect the actual lamp voltage value. A capacitor 15 is connected in parallel to the resistor 17, and serves to reduce high-frequency distortion in the measured signal 51.

An input signal 50 representing the electrical current in the lamp 1 is delivered by a current measuring unit 12 to the control unit 10. The current measuring unit 12 might for example operate on the principle of induction.

To effect driving scheme switchovers and power control strategy switchovers according to the method described, the realisation of the control unit 10 includes an event management unit 40, a driving scheme management unit 41 and a power control strategy management unit 42. These units 40, 41, 42 may each evaluate one or more of the monitored lamp values 50, 51. For the sake of clarity, the connections between the signals 50, 51 and the blocks 40, 41, 42 are not shown in the diagram. In this embodiment example, the event management unit 40 observes the measured value of lamp voltage provided by the signal 51, and accordingly plans a driving scheme switchover to take place at a certain instant in time. The event management unit 40 may take these steps to stabilise the arc length in the lamp, or to avoid a situation in which, for example, the lamp voltage drops to an unfavourably low level. The event management unit 40 delivers appropriate control information 410 to the driving scheme management unit 41, which causes the driving scheme switchover to take place at the appointed instant in time. The driving scheme management unit 41 has access to control values relating to driving schemes $DS_1$, $DS_2$, and the appropriate values are chosen according to the signal 410.

The event management unit 40 can determine whether the power control strategy switchover should occur synchronously with the driving scheme switchover, or whether the power control strategy switchover should precede the driving scheme switchover. The event management unit 40 can be programmed to make a certain decision, or the decision can be based on the monitored lamp parameters 50, 51. If the power control strategy switchover is to precede the driving scheme switchover, the event management unit 40 retrieves information 54 from a memory 43, for example a value pertaining to a temporal offset $t_p$. Then, at a time interval $t_p$ before delivering control information 410 to the driving scheme management unit 41, the event management unit 40 issues a suitable command 420 to the power control strategy management unit 42, which then causes a power control strategy switchover. The power control strategy management unit 42 has access to control values relating to driving schemes $PC_s$, $PC_f$, and the appropriate values are chosen according to the signal 420.

For example, during 'normal' operation of the lamp 1, the event management unit 40 can decide, on the basis of observed lamp values 50, 51, that a switchover from a first driving scheme $DS_1$ to a second driving scheme $DS_2$ will be necessary at a certain time $t_{sw}$ in the near future, and that a switchover from slow power control strategy $PC_s$ to fast power control strategy $PC_f$ should precede the driving scheme switchover by a time interval $t_p$. Accordingly the event management unit 40 issues an appropriate command 420 to the power control strategy management unit 42, so that the power control strategy switchover takes place in due time before the driving scheme switchover, which is in turn initiated by the event management unit 40 by means of an appropriate command 410 to the driving scheme management unit 41.

Subsequently, the event management unit 40 can evaluate one or more of the lamp parameters 50, 51, and can decide to revert back to a slow power control strategy $PC_s$ when a lamp parameter has stabilised to a predefined threshold. Such threshold information can also be stored in the memory 43 of the event management unit 40. The decision to revert back to the slow power control strategy $PC_s$ is given as an appropriate command 420 to the power control strategy management unit 42.

Alternatively, the event management unit 40 can simply wait for a predetermined time interval $t_p$, as given by a value stored in the memory 43, to elapse before issuing the appropriate command 420 to the power control strategy management unit 42.

In a similar fashion, the event management unit 40 determines when or whether the driving scheme should revert back to the first driving scheme $DS_1$, and issues the appropriate command 410 to the driving scheme management unit 41.

The illustrated control unit 10 with the units 40, 41, 42 is understood to be only exemplary, and any appropriate realisation of the units 40, 41, 42 could be applied. For example, the power control strategy management unit 42 can include the necessary units or modules required to calculate an average or mean voltage for use in a 'slow' or indirect power control strategy. Such an average voltage value can be determined, for instance, using a root-mean-square (RMS) algorithm. Functions of the units 40, 41, 42 can be distributed as required. The control unit 10, for example, can comprise a processor for carrying out some of the functions of the method using suitable software algorithms, and a memory for storing predefined values or values computed during application of the method. Other functions of the units 40, 41, 42 can be realised using appropriate hardware components incorporated in or mounted on one or more printed circuit boards.

Figure 6:
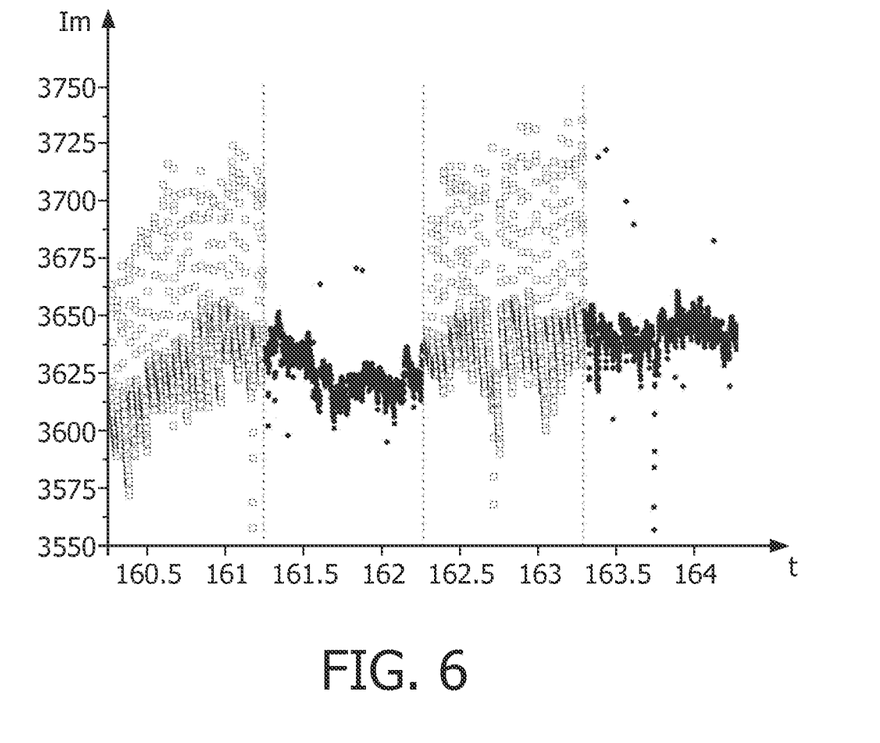
FIG. 6 shows a graph of the collected light flux as a function of time for a lamp intermittently operated using a lamp driving method according to the invention.

FIG. 6 shows a graph of the collected light flux in lumen (lm) as a function of time (t) measured in hours for a gas-discharge lamp being driven using the lamp driving method disclosed in PCT/IB 2007/052968, in which a closed-cycle power compensation loop is used to drive the lamp at a required lamp power level. The required lamp power can be calculated using measurements taken for lamp voltage, pressure in the lamp, etc. For example, a mathematical approximation of the required lamp power value $P_R$ can be an n-th order polynomial function of the lamp voltage $U_L$ as described by the following equation:

$$P_R(U_L) = c_n \cdot U_L^n + c_{n-1} \cdot U_L^{n-1} + \ldots + c_2 \cdot U_L^2 + c_1 \cdot U_L + c_0$$

where n is a positive, natural number and $c_n, c_{n-1}, \ldots, c_2, c_1, c_0$ are polynomial coefficients that depend on parameters like the collecting etendue, the electrode fall voltage, the reflectivity of the collecting optics, the intrinsic efficacy, and the target light flux. These parameters can be measured or predicted using conventional techniques, as will be known to a person skilled in the art. The accuracy of the power compensation depends on the number of terms of the polynomial function.

The experimental values for FIG. 6 were obtained in a time interval of 4 hours of operation. In this time, the lamp driver caused the driving scheme to intermittently switch between a plurality of different driving schemes ($DS_1$, $DS_2$) whenever the necessity arose, for example to avoid the electrodes burning back too far, or to avoid the lamp voltage dropping too low. The white square symbols in the graph—during the first and third hour of the operation interval shown—indicate values of light-flux measured during operation of the lamp in which the lamp power was only controlled using the known 'slow' power control technique, i.e. by using an average voltage value or a voltage value obtained from a derivative. The black dots—during the second and fourth hour of the operation interval shown—indicate values of light-flux measured while the lamp was driven using the method according to the invention, i.e. when the power control strategy was changed from a 'slow' strategy to a more direct or 'fast' strategy for brief intervals of time, to quickly adjust to changes during driving scheme switches. While the lamp was being driven using the method according to the invention, as can clearly be seen from the graph, the collected flux of the lamp did not fluctuate to the same extent as when the lamp was being driven using only a slow power control strategy.

Figure 7A:
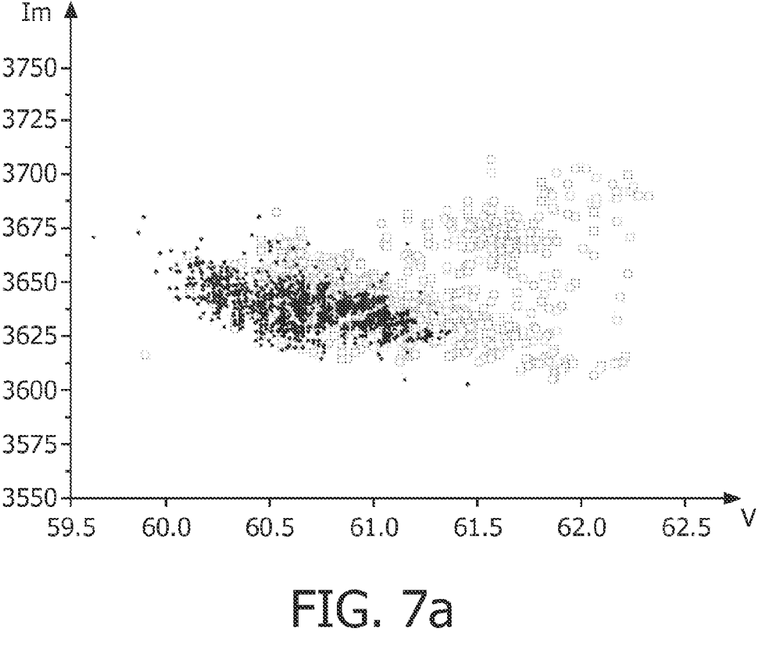
FIG. 7a shows a graph of the collected light flux as a function of voltage for a lamp intermittently operated using a lamp driving method according to the invention.

FIG. 7a shows a graph of the collected light-flux in lumen (lm) as a function of voltage (V) for a lamp intermittently operated using a lamp driving method according to the invention, using values that were obtained in the course of an experiment similar to the one illustrated by FIG. 6 above, but without the power compensation technique as described in PCT/IB 2007/052968. Again, a clear distinction can be made out between the overall steady values of light-flux (black dots) obtained while the lamp was operated using the method according to the invention, and the more scattered values (white squares) observed while the lamp was operated using only a single slow power control strategy. The black dots are collected over a distinct area in the graph, showing that the light output of the lamp does not noticeably fluctuate, even when the voltage increases. In contrast to these values, the white squares are distributed over a much wider area in the graph, showing that the light output of the lamp is subject to much greater fluctuations when only a 'slow' power control strategy is used.

Figure 7B:
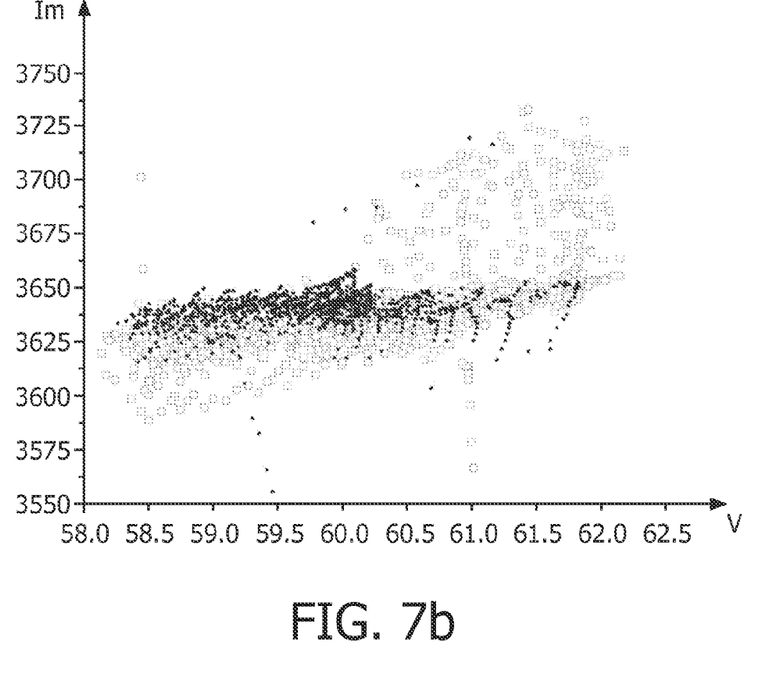
FIG. 7b shows a graph of the collected light flux as a function of voltage for a lamp intermittently operated using a lamp driving method according to the invention, under application of an additional power compensation technique.

FIG. 7b shows a similar graph in which the power compensation technique as described in PCT/IB 2007/052968 was applied for the duration of the experiment in which the lamp was intermittently operated using a lamp driving method according to the invention. This time, the values are those that were obtained for the graph of FIG. 6. Compared with FIG. 7a, this graph demonstrates that a further improvement can be obtained using this supplementary power compensation in addition to the power control strategy switchover according to the invention, since the measured values of light-flux obtained during operation of the lamp using the method according to the invention (black dots) can be seen to even follow a distinct line. Changes in the operating voltage are associated even less with a marked fluctuation in light output of the lamp.

Figure 8:
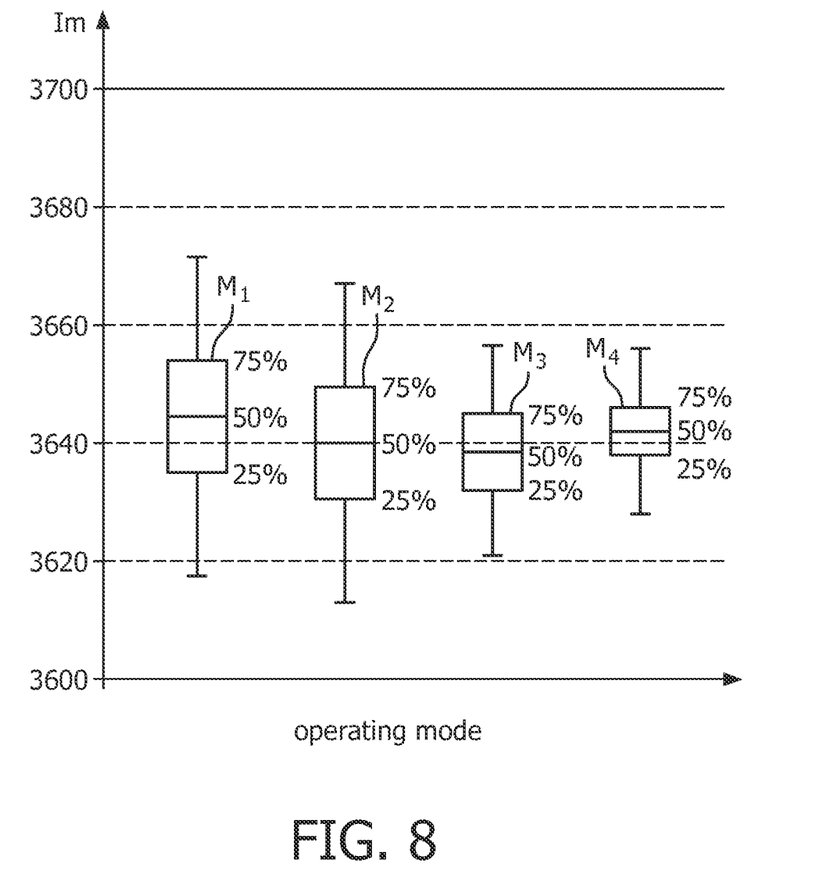
FIG. 8 shows a box plot of the spread of the collected light flux for the different modes of operation observed in FIGS. 7a and 7b.

FIG. 8 shows a box plot of the spread in collected light-flux in lumen for the different modes of operation observed in FIGS. 7a and 7b. In the first mode of operation M1, the lamp power was controlled using only a 'slow' state of the art method based on an average value of lamp voltage. In the second mode of operation M2, the 'slow' power control was augmented by a power compensation as disclosed in PCT/IB 2007/052968. In the third mode of operation M3, the lamp was driven using the method according to the invention. Finally, in the fourth mode M4, the lamp was driven using the method according to the invention, and an additional power compensation was carried out according to PCT/IB 2007/052968. The variations or spread in light-flux as percentage deviation from a mean value are shown for each mode M1, M2, M3, M4. As can be seen from the graph, the best results—i.e. the results showing the least deviation—were obtained for the third mode M3 and fourth mode M4. The method according to the invention therefore offers a considerable improvement in light flux stabilisation when compared to state of the art methods (modes M1, M2) of driving a gas-discharge lamp.

Although the present invention has been disclosed in the form of preferred embodiments and variations thereon, it will be understood that numerous additional modifications and variations could be made thereto without departing from the scope of the invention. For example, the control unit described can also include the necessary units or modules for carrying out a power compensation as outlined above and disclosed in PCT/IB 2007/052968. In another possible realisation, each lamp driving scheme can be associated with its own power control strategy, advantageous when the different lamp driving schemes are known to result in fluctuations to different extents and over different time-scales. For example, when a lamp driving scheme is only to be applied for a very brief duration, this can be accompanied by default by a fast power control strategy. In yet another variation, the driving scheme management unit may choose a driving scheme in which the lamp is driven at constant current, and issue the appropriate signals to the switch controller, for example when a fluctuation in lamp voltage is known to be transient, and the average lamp current should not change during this temporary fluctuation.

For the sake of clarity, it is to be understood that the use of "a" or "an"throughout this application does not exclude a plurality, and "comprising" does not exclude other steps or elements. A "unit" or "module" can comprise a number of units or modules, unless otherwise stated.

List of Reference Signs 1 gas-discharge lamp
2 electrodes
3 arc tube
4 driving unit
8 external power supply
9 connectors
10 control unit
12 current measuring unit
14 voltage measuring unit
15 capacitor
16 resistor
17 resistor
20 switch
21 diode
22 inductance
23 capacitor
24 buck converter
25 commutation unit
26 switch controller
27 switch
28 switch
29 switch
30 switch
31 ignition controller
32 ignition arrangement
33 choke
34 choke
35 level converter
40 event management unit
41 driving scheme management unit
42 power control strategy management unit
43 memory
50 lamp current signal
51 lamp voltage signal
52 driver control signal
53 level converter control signal
54 information signal
410 control signal
420 control signal
$t_{sw}$ trigger event
$t_m$ time interval
$t_f$ predefined time interval
$t_p$ predefined time interval
$DS_1$ first driving scheme DS₂ second driving scheme
PC_s first power control strategy
PC_f second power control strategy
M1 first mode of operation
M2 second mode of operation
M3 third mode of operation
M4 fourth mode of operation

The invention claimed is:

1. A method of driving a gas-discharge lamp and stabilizing the light flux of the lamp under constant flux requirements,
   wherein, at any one time, the lamp is driven according to one of a plurality of different driving schemes ($DS_1$, $DS_2$) and the lamp power is controlled according to one of a plurality of different power control strategies ($PC_s$, $PC_f$),
   wherein the lamp is driven according to a first driving scheme ($DS_1$) prior to a trigger event ($t_{sw}$) and, upon occurrence of the trigger event ($t_{sw}$), a driving scheme switchover is effected so that the lamp is subsequently driven according to a second driving scheme ($DS_2$),
   wherein, in temporal dependence on the trigger event ($t_{sw}$), a power control strategy switchover is effected from a first power control strategy ($PC_s$) to a second power control strategy ($PC_f$) such that the lamp power is subsequently controlled according to the second power control strategy ($PC_f$) for a time interval ($t_m$, $t_f$), and
   wherein at least one of the power control strategies ($PC_s$, $PC_f$) comprises a direct power control strategy ($PC_f$) and at least one of the power control strategies ($PC_s$, $PC_f$) is an indirect power control strategy ($PC_s$) and, when the lamp power is being controlled according to a direct power control strategy.

2. A method according to claim 1, wherein the power control strategy switchover takes place simultaneously with the driving scheme switchover.

3. A method according to claim 1, wherein the power control strategy switchover precedes the driving scheme switchover.

4. A method according to claim 1, wherein the time interval ($t_f$) lasts for a predefined duration.

5. A method according to claim 1, wherein one or more lamp parameters are observed, and the time interval ($t_m$) lasts until a lamp parameter satisfies a predefined condition.

6. A method according to claim 1, wherein the power control strategy switchover in temporal dependence on the trigger event ($t_{sw}$) comprises a switchover from an indirect power control strategy ($PC_s$) to a direct power control strategy ($PC_f$).

7. A method according to claim 6, wherein, after expiration of the time interval ($t_m$, $t_f$), control of the lamp power reverts to the indirect power control strategy ($PC_s$).

8. A driving unit for driving a gas-discharge lamp, the unit comprising:
   an event management unit for detecting or anticipating a trigger event ($t_{sw}$);
   a driving scheme management unit for selecting one of a plurality of different driving schemes ($DS_1$, $DS_2$), according to which the lamp is to be driven, based on the output of the event management unit;
   and a power control strategy management unit, which power control strategy management unit is realised to select, in temporal dependence on the trigger event ($t_{sw}$), one of a plurality of different power control strategies ($PC_s$, $PC_f$) according to which the lamp power is to be controlled for a time interval ($t_m$, $t_f$).

9. A method of driving a gas-discharge lamp and stabilizing the light flux of the lamp under requirements of maintaining a constant flux,
   wherein, at any one time, the lamp is driven according to one of a plurality of different driving schemes ($DS_1$, $DS_2$) and the lamp power is controlled according to one of a plurality of different power control strategies ($PC_s$, $PC_f$),
   wherein the lamp is driven according to a first driving scheme ($DS_1$) prior to a trigger event ($t_{sw}$) and, upon occurrence of the trigger event ($t_{sw}$), a driving scheme switchover is effected so that the lamp is subsequently driven according to a second driving scheme ($DS_2$), wherein said trigger event is determined based upon one or more measurements of operating parameters of the lamp, and
   wherein, in temporal dependence on the trigger event ($t_{sw}$), a power control strategy switchover is effected from a first power control strategy ($PC_s$) to a second power control strategy ($PC_f$) such that the lamp power is subsequently controlled according to the second power control strategy ($PC_f$) for a time interval ($t_m$, $t_f$).

10. A method according to claim 9, wherein at least one of the power control strategies ($PC_s$, $PC_f$) comprises a direct power control strategy ($PC_f$) and at least one of the power control strategies ($PC_s$, $PC_f$) is an indirect power control strategy ($PC_s$) and, when the lamp power is being controlled according to a direct power control strategy ($PC_f$), the lamp power reacts faster to changes in lamp voltage than when the lamp power is being controlled according to an indirect power control strategy ($PC_s$).

11. A method according to claim 9, wherein the power control strategy switchover takes place simultaneously with the driving scheme switchover.

12. A method according to claim 9, wherein the power control strategy switchover precedes the driving scheme switchover.

13. A method according to claim 9, wherein the time interval ($t_f$) lasts for a predefined duration.

14. A method according to claim 9, wherein one or more lamp parameters are observed, and the time interval ($t_m$) lasts until one or more of said lamp parameters satisfies a predefined condition.

15. A method according to claim 10, wherein the power control strategy switchover in temporal dependence on the trigger event ($t_{sw}$) comprises a switchover from an indirect power control strategy ($PC_s$) to a direct power control strategy ($PC_f$).

16. A method according to claim 15, wherein, after expiration of the time interval ($t_m$, $t_f$), control of the lamp power reverts to the indirect power control strategy ($PC_s$).

* * * * *